United States Patent [19]

Grondahl et al.

[11] 4,249,291
[45] Feb. 10, 1981

[54] METHOD FOR FORMING A LIQUID COOLED AIRFOIL FOR A GAS TURBINE

[75] Inventors: Clayton M. Grondahl, Clifton Park; Leo C. Willmott, Ballston Spa; Myron C. Muth, Amsterdam, all of N.Y.

[73] Assignee: General Electric Company, Schenectady, N.Y.

[21] Appl. No.: 44,538

[22] Filed: Jun. 1, 1979

[51] Int. Cl.³ ............................................. B23P 15/04
[52] U.S. Cl. ..................... 29/156.8 H; 29/157.3 R; 29/157.3 C; 29/557; 228/183; 228/126
[58] Field of Search .................. 29/156.8 B, 156.8 H, 29/157.3 C, 157.3 R, 445, 557, DIG. 26, 527.6; 416/96 R, 97 R, 97 A; 165/168; 228/156, 126, 127, 183

[56] References Cited

U.S. PATENT DOCUMENTS

| | | | |
|---|---|---|---|
| 2,641,439 | 6/1953 | Williams | 29/156.8 B |
| 2,983,994 | 5/1961 | Johnson | 228/183 |
| 3,305,918 | 2/1967 | Christen et al. | 29/527.6 |
| 3,446,481 | 5/1969 | Kydd . | |
| 3,446,482 | 5/1969 | Kydd . | |
| 3,773,506 | 11/1973 | Larker et al. | 416/96 |
| 4,119,390 | 10/1978 | Dakin et al. | 416/96 R |
| 4,137,619 | 2/1979 | Beltran et al. | 29/156.8 H |
| 4,156,582 | 5/1979 | Anderson | 416/92 |
| 4,185,369 | 1/1980 | Darrow et al. | 29/156.8 H |

FOREIGN PATENT DOCUMENTS

| | | | |
|---|---|---|---|
| 730114 | 1/1943 | Fed. Rep. of Germany | 165/169 |
| 816686 | 10/1951 | Fed. Rep. of Germany | 165/168 |
| 1066524 | 10/1959 | Fed. Rep. of Germany | 29/157.3 R |
| 1301524 | 12/1972 | United Kingdom | 228/183 |

*Primary Examiner*—Daniel C. Crane
*Attorney, Agent, or Firm*—Jerome C. Squillaro

[57] ABSTRACT

A method for forming a liquid cooled airfoil for a gas turbine is disclosed. A plurality of holes are formed at spaced locations in an oversized airfoil blank. A preformed composite liquid coolant tube is bonded into each of the holes. The composite tube includes an inner member formed of an anti-corrosive material and an outer member formed of a material exhibiting a high degree of thermal conductivity. After the coolant tubes have been bonded to the airfoil blank, the airfoil blank is machined to a desired shape, such that a portion of the outer member of each of the composite tubes is contiguous with the outer surface of the machined airfoil blank. Finally, an external skin is bonded to the exposed outer surface of both the machined airfoil blank and the composite tubes.

10 Claims, 6 Drawing Figures

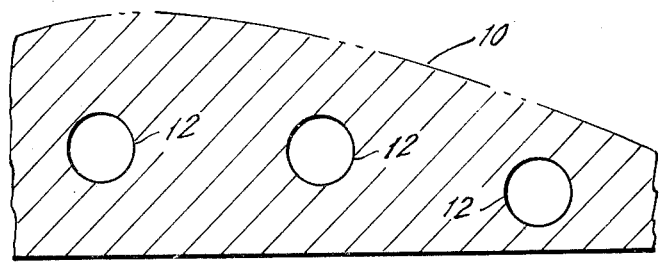
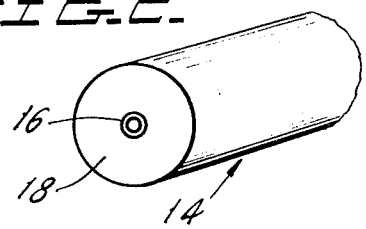
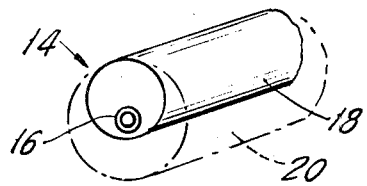
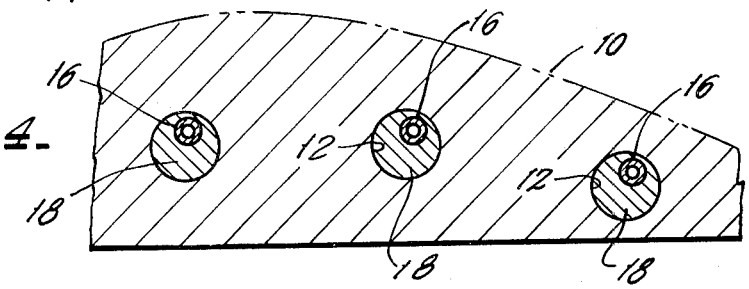
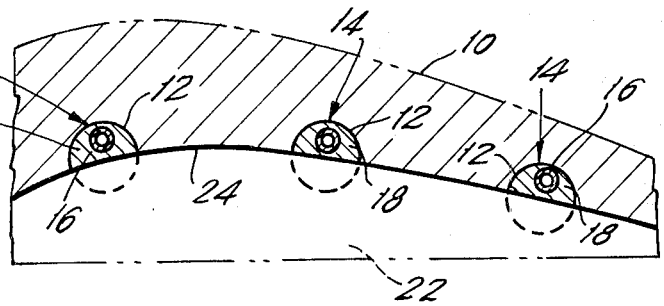
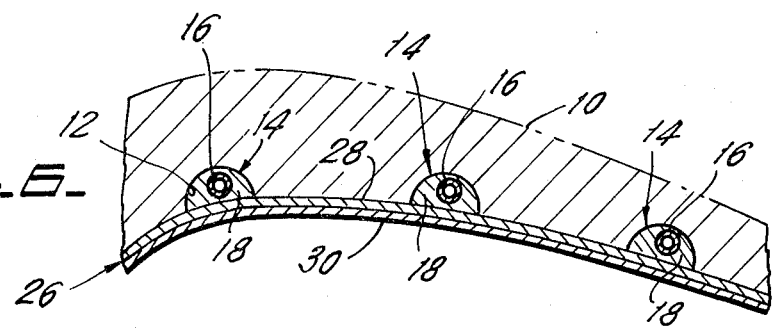

METHOD FOR FORMING A LIQUID COOLED AIRFOIL FOR A GAS TURBINE

BACKGROUND OF THE INVENTION

The present invention is directed towards a method for fabricating an airfoil for water cooled gas turbine buckets. More particularly, the present invention is directed towards a method for fabricating airfoils of the type which include a central core surrounded by a plurality of airfoil coolant tubes located at spaced intervals around the periphery of the core and a composite outer skin encasing both the core and cooling tubes.

Turbine buckets of the foregoing type are known as open circuit liquid-cooled gas turbine buckets and are exemplified by U.S. Pat. Nos. 3,446,481 and 3,446,482, both issued to Kydd. A similar disclosure may be found in U.S. Pat. No. 4,137,619 issued to Adrian N. Beltran et al. The disclosure of these patents is incorporated herein by reference.

In typical prior art manufacturing methods, the central core is preformed to conform to the desired shape of the airfoil. Thereafter, a plurality of grooves which receive airfoil coolant tubes are formed about the outer periphery of the airfoil. These coolant tubes are independently fabricated, inspected and thereafter inserted into the grooves. Finally, an outer skin is welded or otherwise bonded to the central core to form the final airfoil.

One such process is described in U.S. Patent Application Ser. No. 749,719, filed Dec. 13, 1976, now U.S. Pat. No. 4,156,482 in the name of Anderson and assigned to the assignee of the instant invention. The Anderson application discloses a liquid-cooled gas turbine bucket comprised of a core having radially extending grooves of rectangular cross-section recessed into the core, tubes are fitted into these grooves and bonded in place by means of braze material filling in the space between the tubes and sides and bottom of the grooves. A protective skin is then bonded to the outer surface of the core to provide corrosion resistance. The skin is described as a composite of an inner skin which provides high thermal conductivity and an outer skin which provides protection from hot corrosion. The disclosure in the Anderson application of useful materials for preparation of the outer skin, the inner skin, the tubing and the bucket core is incorporated by reference.

The general method of incorporating an assembly to be brazed in a flexible envelope for the establishment within the envelope of a substantially non-oxidizing atmosphere and providing for force application to the envelope during brazing is disclosed in U.S. Pat. No. 3,091,846 to Henry. The disclosure therein is incorporated by reference.

In U.S. Pat. application Ser. No. 889,111, filed Mar. 22, 1978, now U.S. Pat. No. 4,185,369 in the name of Darrow et al and assigned to the assignee of the present invention, a method of fabricating an airfoil which more efficiently transports heat energy from the inside of the airfoil skin surface in contact with hot gas to the outer surface of the coolant tubes recessed in the bucket core is disclosed. In accordance with this method, the bucket is formed from a series of preformed solid components which are assembled, consolidated and then converted into a unified structure. In each of the several embodiments disclosed in the foregoing application, one of the preformed solid components is a flat bi-metallic sheet comprising an erosion-, corrosion-resistant layer and a layer of high thermal conductivity, these layers being joined by an optimized metallurgical bond. The disclosure of this application is incorporated herein by reference.

BRIEF SUMMARY OF THE INVENTION

In accordance with the present invention, a plurality of holes are drilled in an oversized airfoil core blank at spaced locations corresponding to the desired locations of cooling tubes in the airfoil. The cooling tubes are separately fabricated as preassembled composite tube members and are inserted into the holes formed in the airfoil blank. The so-inserted composite tubes are then HIP diffusion bonded or brazed in place.

After the cooling tubes have been affixed to the airfoil blank, the blank is machined to the desired airfoil shape exposing the copper outer layer of the composite tube. An independently fabricated skin is then HIP diffusion bonded to the machined airfoil blank to produce the desired airfoil.

Since the skin and composite tubes are independently fabricated, they may be inspected prior to insertion into the airfoil structure. Additionally, since the final airfoil shape is machined after the cooling tubes have been inserted into the airfoil blank, the outer surface of the combined blank and composite tubes define a smooth continuous surface for skin cladding.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a partial sectional view of an airfoil blank utilized in the method of the present invention.

FIG. 2 is a partial perspective view of a composite tube utilized in the method of the present invention.

FIG. 3 is a second possible composite tube utilized in the method of the present invention.

FIG. 4 is a partial sectional view of the airfoil blank of FIG. 1 after the composite tubes of FIG. 3 have been inserted therein.

FIG. 5 is a partial sectional view of the airfoil blank of FIG. 4 after it has been machined to a desired shape.

FIG. 6 is a partial cross-sectional view of a completed airfoil constructed in accordance with the method of the present invention.

For the purpose of illustrating the invention, there is shown in the drawings a form which is presently preferred; it being understood, however, that this invention is not limited to the precise arrangements and instrumentalities shown.

DETAILED DESCRIPTION OF THE PREFERRED EMBODIMENT

Referring now to the drawings wherein like numerals indicate like elements, there is shown in FIG. 1 an airfoil blank 10 which defines the core of the liquid cooled airfoil of the present invention. Airfoil blank 10 is the basic structural member of the airfoil and is formed of a material selected for its strength. Blank 10 is selected to be larger than the final size of the airfoil since it is machined in subsequent steps.

A plurality of holes 12 are formed in blank 10, preferably by drilling. These holes extend throughout the height of blank 10 and are adapted to receive a plurality of composite tubes 14 which conduct liquid coolant through the airfoil. One composite tube 14 is illustrated in FIG. 2. As shown therein, composite tube 14 includes an inner member 16 which is made of a material selected to withstand the erosion and corrosion of the hot coolant (usually water and steam) to be conducted therethrough, and an outer member 18 which surrounds inner member 16 and is formed of a material which exhibits a high degree of thermal conductivity. Optimal heat transfer is desired in order to permit the coolant fluid passing through the interior of composite tubes 14 to remove heat from the composite skin 26 (described below) of the completed airfoil and thereby efficiently cool the airfoil. Such optimal heat transfer is provided in the composite construction of the present invention by providing a good metallurgical bond between members 16 and 18. In the preferred construction, inner member 16 is prepared from a corrosion resistant metal such as, for example, 347 stainless steel or IN-718 and outer member 18 is a tube of high thermal conductivity material such as a copper alloy. The outer surface of inner member 16 may be plated with a thin layer (about ½ mil) of bright nickel over which a layer of silver (about ½ mil) is applied. The two members 16, 18 are interfitted and then drawn through a series of drawing dies until a snug metal-to-metal fit is obtained, after which the composite tube 14 is fired at about 800° C. to form the silver-copper eutectic alloy joining members 16, 18. Thereafter, the composite tube 14 may be plated with a similar layer of silver to provide a brazing agent for permanently affixing composite tube 14 into its respective hole 12. Alternately, hot isostatic pressure diffusion bonding such as described in U.S. patent application Ser. No. 913,842 filed June 8, 1978, by W.F. Schilling et al and of common assignee, could be employed, if desired.

The composite tube illustrated in FIG. 2 is concentric. If an eccentric tube is desired, it may be formed as shown in FIG. 3. As shown in phantom therein, the concentric tube is initially formed in an identical manner to the composite tube of FIG. 2. Thereafter, the tube is machined to remove the phantom portion 20 of the outer member 18 resulting in the desired eccentric tube 14.

After tubes 14 have been formed and, if desired, inspected, they are placed in each of the holes 12 formed in blank 10. Tubes 14 are then HIP diffusion or brazed in place. The resulting structure is illustrated in FIG. 4. In this embodiment, it has been assumed that eccentrically shaped tubes have been utilized. After tubes 14 have been bonded to airfoil blank 10, the airfoil blank is machined to the desired airfoil shape. As shown in FIG. 5, wherein the phantom portion 22 represents the material removed by machining, the locations of holes 12 are selected to ensure that the outer member 18 of each tube 14 is coextensive with the external surface 24 of blank 10.

After airfoil blank 10 has been machined, an external skin 26 is HIP duffusion bonded or brazed to the external surface of the foil blank. See FIG. 6. Skin 26 is formed of a material which is resistant to oxidation and corrosion caused by the fluid gases passing over the airfoil during operation of the turbine at the design temperatures. One possible material is Inconel 617. In the preferred embodiment, skin 26 is formed of a pair of metallic layers which are designed not only to resist the erosion and corrosion caused by the high temperature gases passing over the airfoil but also to conduct thermal energy hitting the outer surface of skin 26 to the liquid coolant flowing through composite tubes 14. To accommodate these two requirements, skin 26 is preferably formed of an inner layer 28 made of a material exhibiting a high degree of thermal conductivity such as copper, and an outer layer 30 made of an anti-corrosive material such as Inconel 617.

When preparing the composite skin 26, it should be recognized that the bond between layers 28 and 30 is critical. Wherever along the interface between these layers the bond is not perfect, hot spots will develop during the operation of the turbine, which hot spots will result in destruction of the skin and consequent failure of the bucket. For this reason, layers 28, 30 are preferably bonded together as two flat sheets and thereafter bonded to the airfoil blank 10. Although various gold brazing alloys will work well for joining together the layers 28, 30, such alloys are very expensive. It has been found that brazing of a layer of Inconel 617 and a layer of a copper alloy can very successfully be accomplished utilizing an alloy of 97 percent copper and 3 percent silicon as the brazing alloy. This alloy is inexpensive, has a high melting temperature and flow point (970°-1025° C.) and a still higher remelt temperature. Also, the resulting alloy does not run excessively, thereby minimizing the possibility of plugging open passages during the final braze. Alternately, hot isostatic pressure diffusion bonding such as described in the aforementioned Schilling application may be employed, if desired.

The present invention may be embodied in other specific forms without departing from the spirit or essential attributes thereof and, accordingly, reference should be made to the appended claims, rather than to the foregoing specification, as indicating the scope of the invention.

What is claimed is:

1. A method for forming a liquid cooled airfoil for a gas turbine, comprising the steps of:
    (a) forming a plurality of holes at spaced locations in an oversized airfoil blank;
    (b) bonding a pre-formed composite liquid coolant tube in each of said holes, said composite tube including an inner member formed of an anti-corrosive material and an outer member formed of a material exhibiting a high degree of thermal conductivity;
    (c) machining said airfoil blank to a desired shape, the location of said holes being such that a portion of said outer member of each of said composite tubes is contiguous with the outer surface of said machined airfoil blank after machining; and
    (d) bonding an external skin to said outer surface of said machined airfoil blank and said portion of said outer member of each of said composite tubes.

2. The method of claim 1, wherein said holes are formed in said airfoil blank by drilling.

3. The method of claim 1, wherein said composite liquid tubes are HIP bonded to said airfoil blank.

4. The method of claim 1, wherein said inner member of said composite tube is formed of stainless steel and said outer member of said composite tube is formed of copper alloy.

5. The method of claim 1, wherein composite tubes are formed by:
    (a) providing an inner member formed of stainless steel;

(b) coating the outer surface of said inner member with a thin layer of nickel;

(c) coating said nickel layer with a silver layer;

(d) inserting said coated inner member in said outer member; and (e) bonding said inner and outer members together.

6. The method of claim 5, wherein said step of bonding said inner and outer members together comprises the steps of:

(a) drawing said inner and outer members through a series of drawing dies after said inner member is inserted in said outer member until a snug metal-to-metal fit is obtained; and (b) firing said drawn inner and outer members until a silvercopper eutectic alloy is formed which joins said inner and outer members.

7. The method of claim 4 wherein said corrosion resistant material is IN-718.

8. The method of claims 1 or 4, wherein said external skin is formed of Inconel 617.

9. The method of claim 1, wherein said external skin comprises an inner layer exhibiting a high thermal conductivity and an outer layer exhibiting a high resistance to corrosion.

10. The method of claim 1, 3, 4, 6 or 9, wherein said composite tubes are formed with a concentric opening extending therethrough and are thereafter machined to remove part of said outer member of said tube so as to result in a composite tube having an eccentric opening extending therethrough.

* * * * *